(12) United States Patent
Aksal

(10) Patent No.: US 6,338,372 B1
(45) Date of Patent: Jan. 15, 2002

(54) FLOATER-CONTROLLED FLAP VALVE FOR FUEL TANK FILLING PIPE

(75) Inventor: Aziz Aksal, Treuchtlingen (DE)

(73) Assignee: Alfmeier Präzision AG Baugruppen und Systemlösungen, Treuchtlingen (DE)

( * ) Notice: Subject to any disclaimer, the term of this patent is extended or adjusted under 35 U.S.C. 154(b) by 0 days.

(21) Appl. No.: 09/680,312

(22) Filed: Oct. 6, 2000

(30) Foreign Application Priority Data

Oct. 6, 1999 (DE) .......................................... 199 48 179

(51) Int. Cl.$^7$ ................................................. B65B 1/04
(52) U.S. Cl. ........................ 141/198; 141/301; 220/86.2
(58) Field of Search .......................... 141/198, 95, 301; 220/86.2; 137/409, 592, 448

(56) References Cited

U.S. PATENT DOCUMENTS

| 2,340,936 A | * | 2/1944 | Cook |
| 5,381,838 A | * | 1/1995 | Watanabe et al. |
| 6,012,599 A | * | 1/2000 | Miura et al. |

* cited by examiner

Primary Examiner—Steven O. Douglas
(74) Attorney, Agent, or Firm—Venable; Gabor J. Kelemen

(57) ABSTRACT

A flap valve for the filling pipe of a motor vehicle fuel tank, comprising a pipe section (3) that projects at a slant into the tank, a valve flap (2) that is positioned so as to rotate therein and has two pivoting arms (33), which project on the side from the pipe section, as well as a floater (1) that is guided axially on the outside peripheral surface of the pipe section. The pivoting arms (33) are hinged with their free ends to this floater. In the fully assembled state, the lower front of the floater (1) has an essentially horizontally extending plane, namely a frontal plane (17).

6 Claims, 6 Drawing Sheets

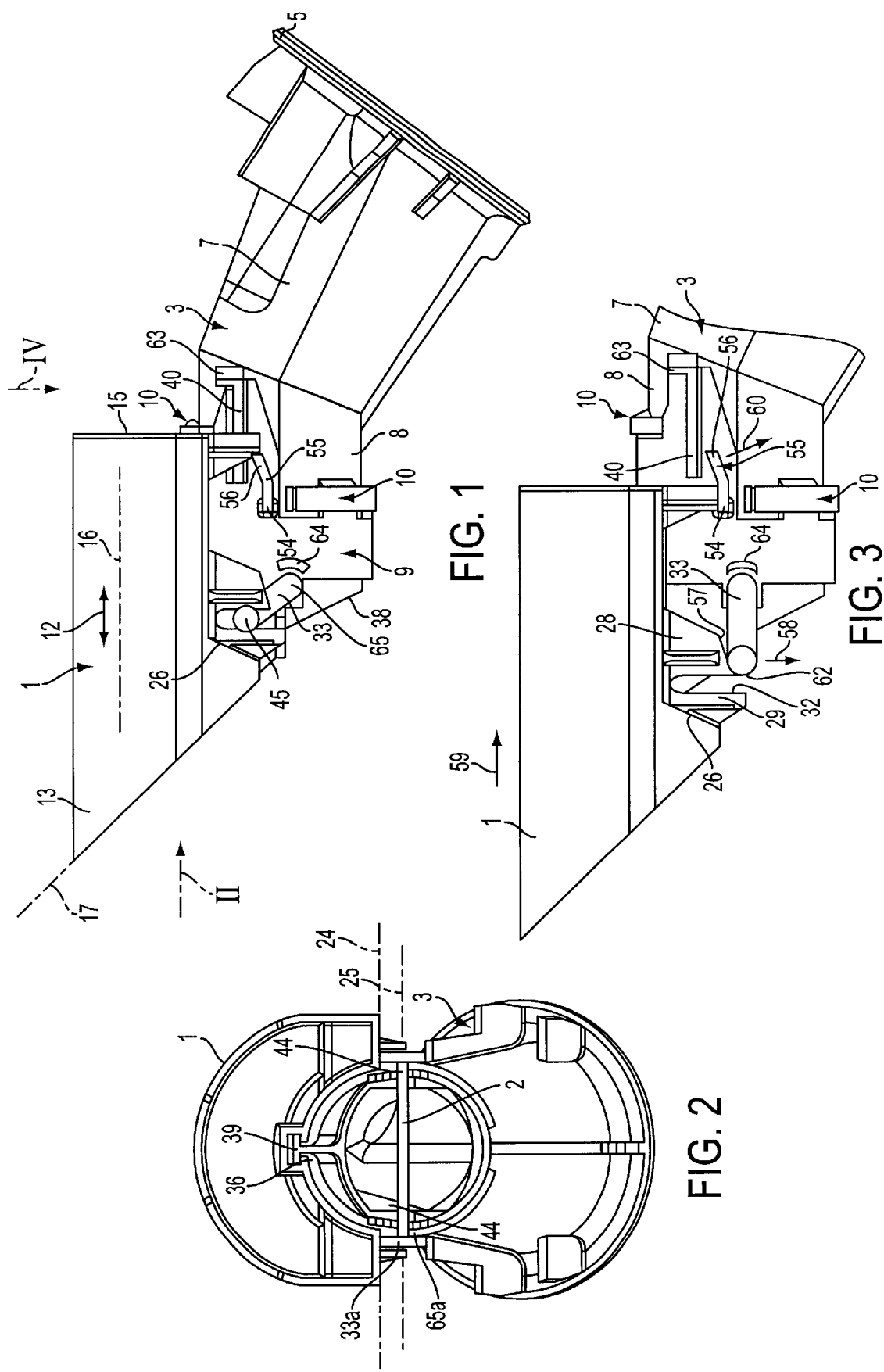

FLOATER-CONTROLLED FLAP VALVE FOR FUEL TANK FILLING PIPE

Figure 4:
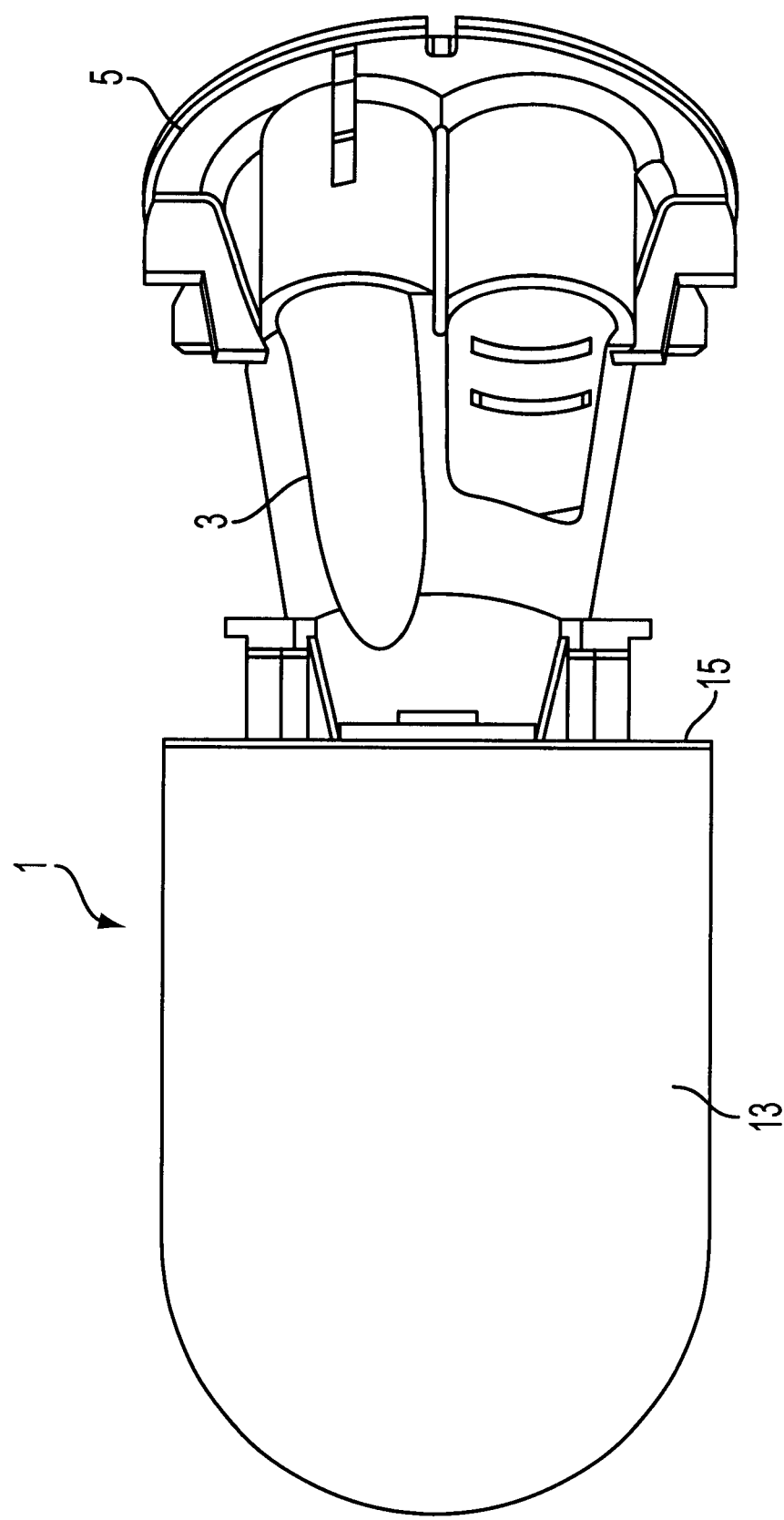

The invention relates to a floater-controlled flap valve for the filling pipe of a fuel tank. With valves of this type, the flow cross section of the filling pipe end that projects into the tank is formed by a pipe section, which can be closed off with a flap. The flap is positioned pivoting inside the pipe and extends through the pipe walls with two diametrically opposite arranged bearing journals. Two pivoting arms are formed onto the bearing journals on the outside of the pipe, which are hinged to the floater. The floater is positioned such that it can be displaced in axial direction along the periphery of the pipe section. The floater is lifted up when the fuel level rises. In the process, the pivoting arms are carried along and the flap is accordingly closed. While the flap is closed, the fuel that is pumped through a pump nozzle into the tank quickly rises inside the filling pipe, which then leads to the pump nozzle being shut off.

The fuel tanks used in present-day motor vehicles in most cases have very irregular shapes to allow for an optimum use of the space available inside the vehicle. Accordingly, the space available for installing components inside the fuel tank is frequently very small. A compact, space-saving installation method is therefore generally the goal when arranging components inside a fuel tank. The same holds true for the filling pipe section projecting into the tank or a flap valve.

It is the object of the invention to propose a flap valve of the aforementioned type with reduced structural length, meaning a more compact design.

This object is solved in that the floater, positioned at the end of the pipe section that projects at a slant into the inside space of the tank, is designed such that its lower front, as seen in the assembled state, essentially covers a horizontally extending frontal plane. Floaters for the flap valves in question have a hollow design and are open on the bottom. A floater of this type consequently does not start to swim upward until the liquid level encloses the air volume on the inside. The design according to the invention ensures that the aforementioned air volume is enclosed almost immediately and a liquid displacement can occur during a further rise in the fuel level, as soon as the fuel level reaches the area of the lower front edge region of the floater. If the front edge region of the floater does not have a level design and is not aligned horizontally, the wall areas of the floater are initially submerged into the liquid, without this resulting in a lifting force worth mentioning. On the contrary, the floaters in most cases are made of fuel-resistant polyoxymethylene (POM), a plastic with a higher specific weight than the fuel. These floater wall regions that are not effective for the lifting force not only extend the floater unnecessarily, but also represent a totally ineffective ballast that must be compensated by a corresponding floater volume, meaning the floater length. As a result of the slanted design or slanted arrangement of the floater according to the invention, said floater has a larger frontal surface that cooperates with the fuel level. The larger this surface, the shorter the submerging depth necessary for a predetermined lifting force. A shorter submerging depth with the same lifting force means a clearly improved response sensitivity of the flap valve.

The pivoting arms of the valve flap for the advantageous embodiment according to claim 2 are shorter than half the outside diameter of the pipe section. As a result, a reduced pivoting path is initially achieved for the free ends of the pivoting arms that are movement-connected to the floater. The displacement distance of the floater is accordingly shortened, which in turn favors a more compact design and improves the response sensitivity. More free space is created owing to the fact that the free ends of the pivoting arms do not project over the apex of the peripheral region of the pipe section arranged between the pivoting arms. This free space can be used to enlarge the floater and to arrange the floater as close as possible on the pipe section. An increased cross-sectional surface of the floater in turn means a lower submerging depth and thus a more compact design in longitudinal direction.

The modifications according to claims 3 to 5 make it easier to attach the floater to the pipe section.

The invention is explained further with the aid of the exemplary embodiment shown in the enclosed drawings. Shown are in:

FIG. 1 A view from the side of a pipe section with a floater that is positioned axially thereon.

FIG. 2 A view in the direction of arrow II in FIG. 1

FIG. 3 A view from the side according to FIG. 1, but with the floater in a state prior to the assembly.

FIG. 4 A view from above in the direction of arrow IV in FIG. 1.

Figure 5:
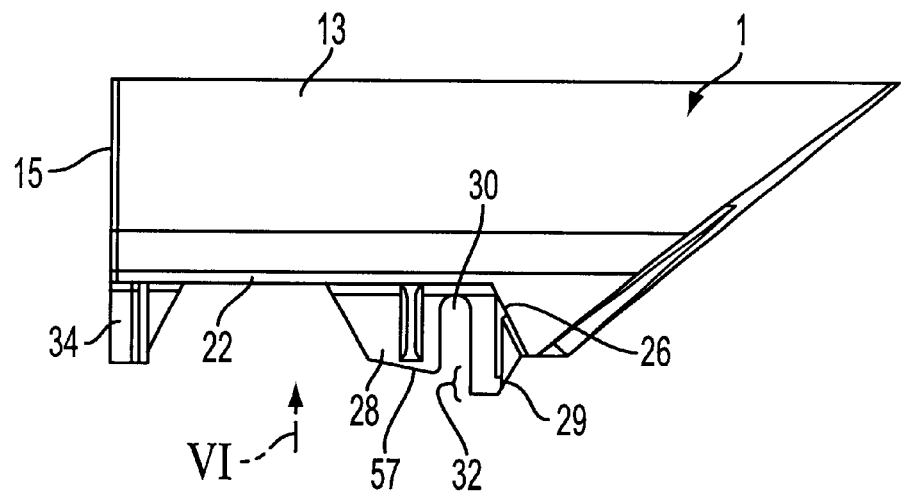

FIG. 5 A single floater in a view from the side.

Figure 6:
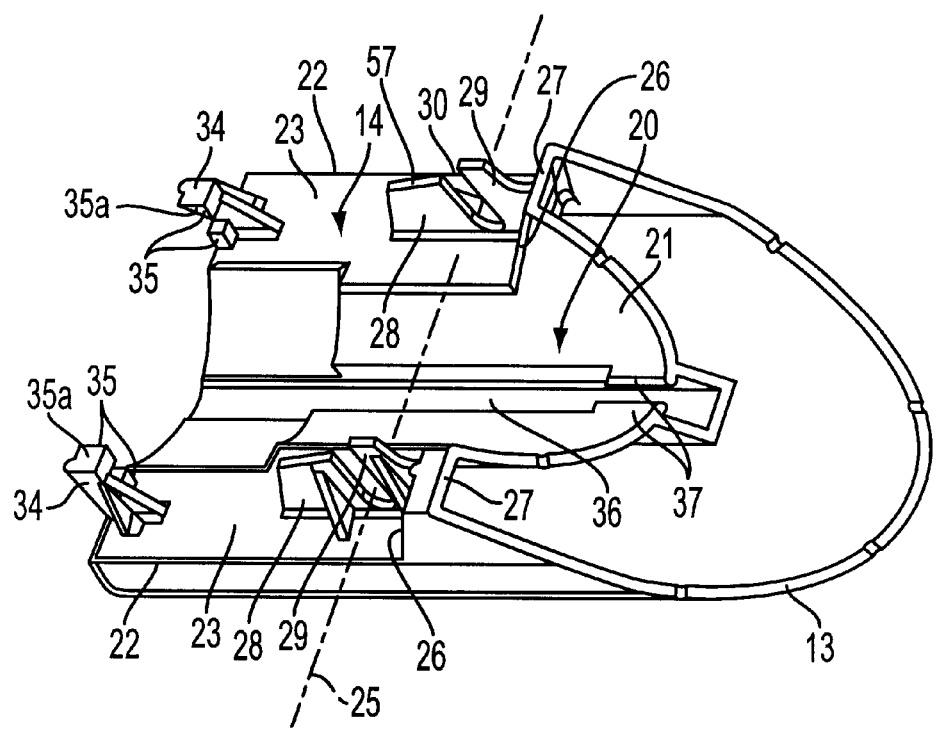

FIG. 6 A perspective view of the floater, in the direction of arrow VI in FIG. 5.

Figure 7:
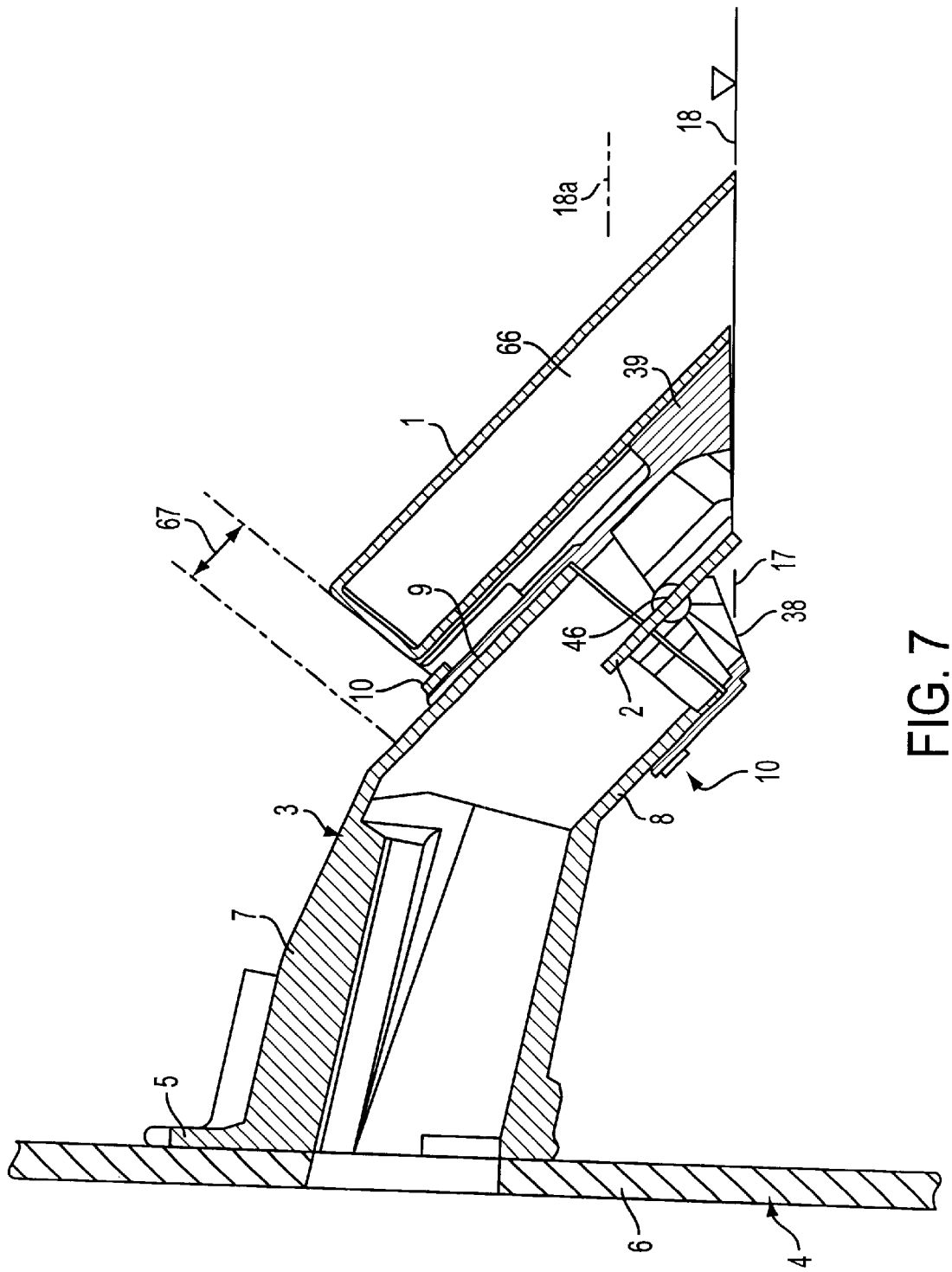

FIG. 7 A longitudinal section through a pipe end attached to a tank wall, with opened valve flap.

Figure 8:
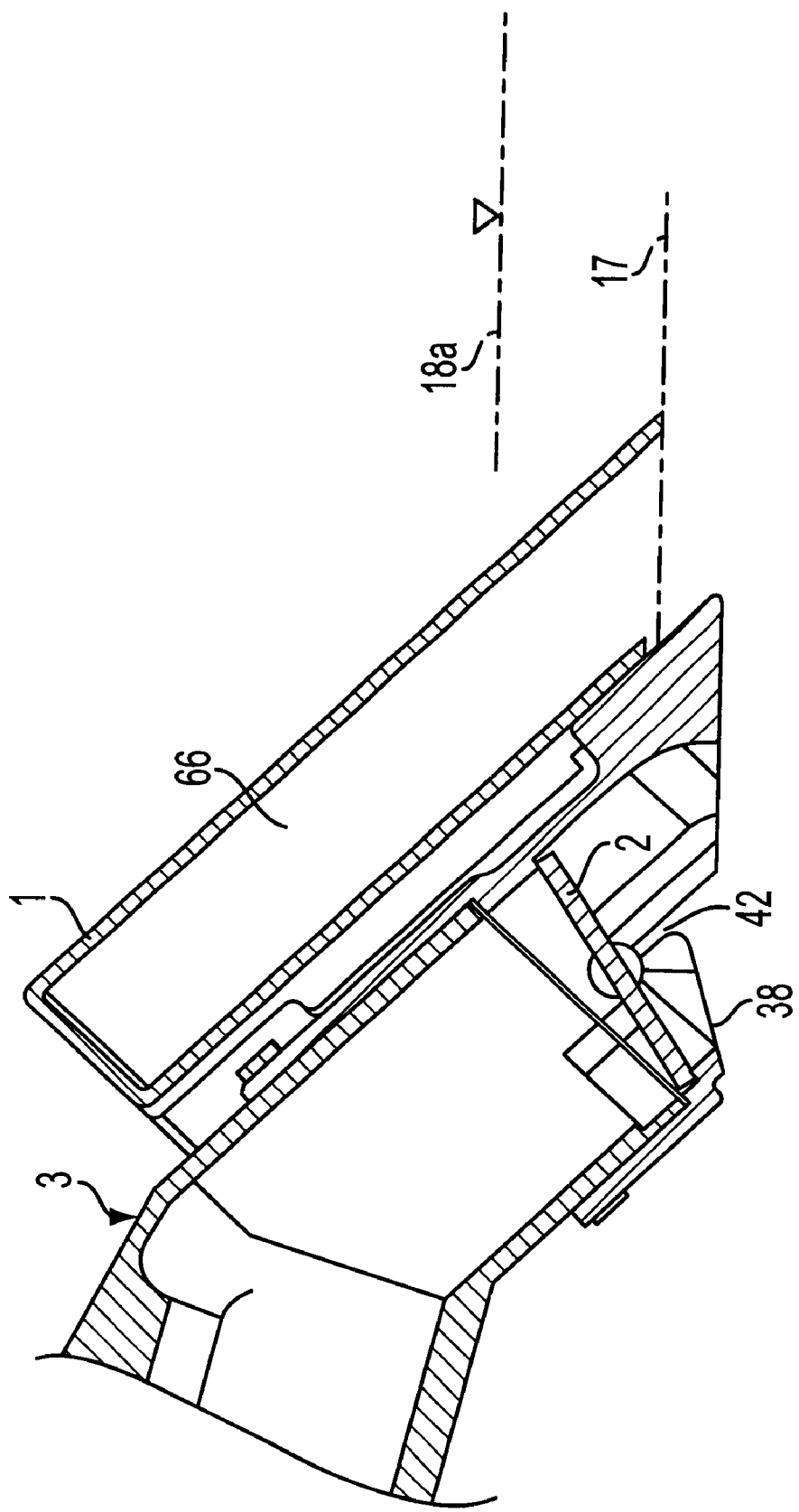

FIG. 8 A detail from FIG. 7, showing the pipe end with the valve flap closed.

Figure 9:
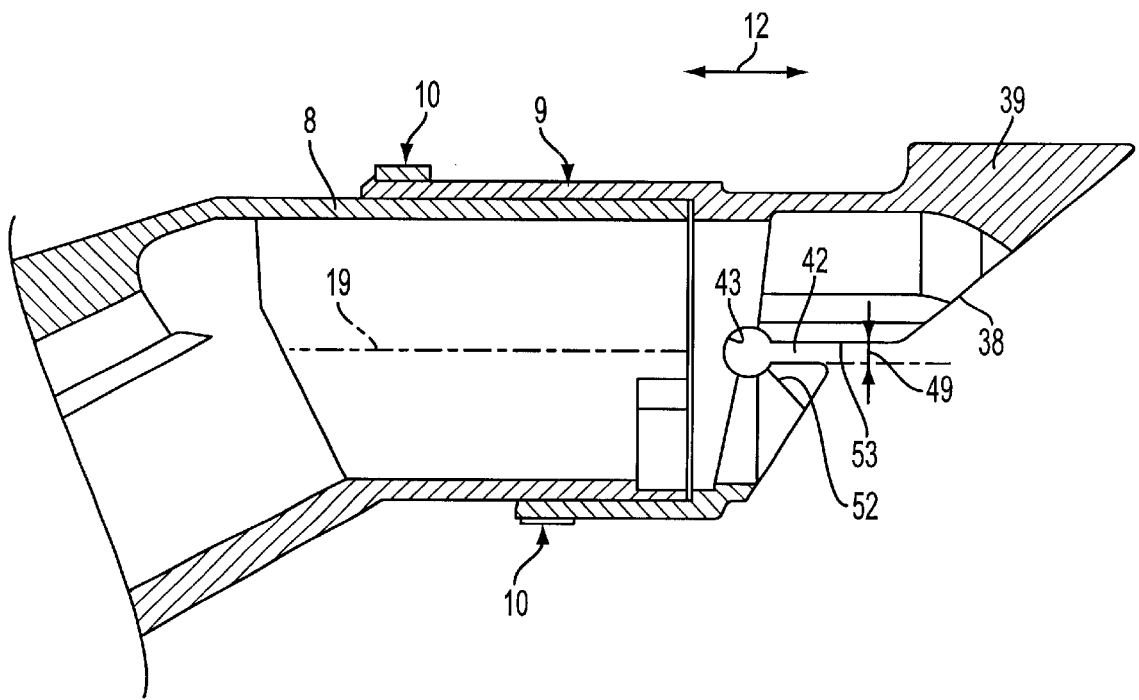

FIG. 9 A pipe section with removed floater and removed valve flap.

Figure 10:
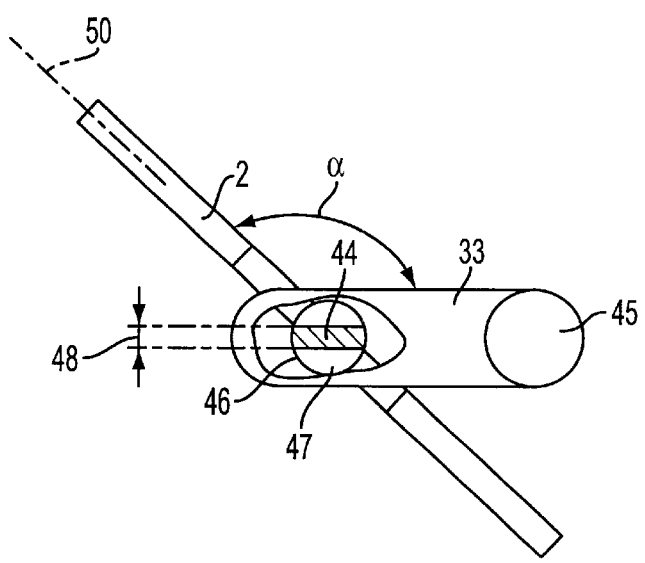

FIG. 10 The view from the side of a valve flap with an opening in the area of its pivoting axis.

A flap valve of the type discussed here essentially consists of a floater 1 and a valve flap 2. These components are attached to a pipe section 3, which forms the filling pipe end that projects into the inside space of a fuel tank 4. One end of the pipe section is provided with a radially outward extending flange 5, which can be used to secure the pipe section to a side wall 6 of the fuel tank 4 (FIG. 7). The pipe section 3 is furthermore designed with an angle, wherein a first longitudinal section 7 extends away from the flange 5 and is slanted less in the fully mounted state than the adjacent longitudinal section 8. A pipe-section shaped support 9 is fitted from the front end onto the longitudinal section 8 and is secured there with the aid of snap-on connections 10. The valve flap 2 is positioned pivoting on the support 9 and the floater 1 is guided such that it can be displaced in axial direction 12.

The floater 1 is a molded plastic part made from polyoxymethylene (POM), which essentially consists of three walls. The wall 13, which represents the outer wall in the fully assembled state, forms the peripheral area of a cylinder-shaped shell. The inside wall 14, which faces the pipe section 3 in the fully assembled state, extends between the longitudinal edges of the outer wall 13. A third wall, namely a frontal wall 15, completes the upper front of the floater, as seen in the fully assembled state. The frontal wall extends in a plane that is perpendicular to the longitudinal axis 16 of the floater. The lower front of the floater 1, on the other hand, is open. The frontal edges of walls 13 and 14 extend essentially in one plane, namely the frontal plane 17. The frontal plane 17 extends at an angle to the longitudinal axis 16. The slant of longitudinal section 8 of pipe section 3 and the bevel of floater 1 are matched, so that in the fully assembled state (FIG. 7), the frontal plane 17 extends essentially in horizontal direction and is thus oriented parallel to the fuel level 18. The inside wall 14 has a central wall region 21 that extends over the complete length of floater 1 and is hollowed out in the shape of a conduit, which is arranged approximately concentric to the outside wall 0.13 or concentric to the center longitudinal axis 19 of the longitudinal section 8. In the fully assembled state, this wall region forms a holding cavity 20, in which a peripheral section of the essentially tube-shaped support 9 is embedded. The wall regions 23, which respectively extend from the central wall region that forms the holding cavity 20 in radial direction toward the outside and toward the longitudinal edges 22 of outside wall 13, extend in one plane 24. This plane extends parallel to the longitudinal axis 16 of floater 1 or, in the fully assembled state, parallel to the pivoting axis 25 of valve flap 2 (FIGS. 2, 5). The end of wall region 23 that faces the frontal plane 17 forms a slanted section 26, which projects from its plane. The central wall region 21 is formed onto the inward-pointing edge of the slanted section while the outside wall 13 is formed onto the outside edge. The edge 27 that passes between the side edges extends in the frontal plane 17. As a result of the above-described design, the floater 1 is provided with an enlarged frontal region that increases the lifting force.

Respectively two wall ridges 28, 29 project approximately at right angles from the wall regions 23 and extend in the direction of longitudinal axis 16. With the edge facing the frontal plane 17, the wall ridges 29 are formed onto the slanted sections 26. The two wall ridges 28, 29 between them enclose a holding slot 30 in the form of a blind hole.

The wall ridge 29 is longer than the wall ridge 28, wherein the excess ridge section forms an end stop 32 that cooperates with pivoting arms 33, which are formed onto the side of valve flap 2. At the end of wall region 23, which is located opposite the slanted sections 26, two guide ridges 34 are formed on that project at a right angle from the plane for these wall regions. The inside areas of these guide ridges, which face each other, are provided with two projections 35 that are arranged at an axial distance to each other. A guide groove 36 is inserted into the bottom of the holding cavity 20 and extends in the direction of longitudinal axis 16. In the region of frontal plane 17, the central wall region 21 projects in the form of diametrically opposite arranged longitudinal ridges 37 into the longitudinal groove 36. The longitudinal ridges 37 here extend in the direction of longitudinal axis 16. The tops of these ridges are aligned with the top of the central wall region 21 that adjoins on the side.

The front 38 of support 9, which points away from the longitudinal section 8, is provided with a slant that matches approximately the slant on the floater 1. A guide rail 39 with T-shaped cross section is formed onto the peripheral area of support 9 that faces the floater 1 in the assembled state. The guide rail extends away from the slanted frontal edge and is approximately twice as long as the distance 67 for displacing the floater 1. The guide rail 39 operates jointly with the guide groove 36 and, in particular, with the region that is narrowed as a result of the longitudinal ridges 37. FIG. 2 in particular shows that the guide rail 39 is inserted form-fittingly, with play, into the narrowed section of guide groove 36, such that the floater 1 can be displaced in axial direction 12. On the side, on the end of support 9 that is facing away from the front 38, respectively one guide rail 40 with approximately square cross section is formed on. In the fully assembled state, these guide rails engage in the[1] between the two projections 35 on the guide webs 34 of floater 1.

[1]Note: The sentence is incomplete.

Two diametrically opposite arranged insertion slots 42 extend from the front 38 of support 9 in axial direction 12. The blind end of the insertion slots 42 is expanded to form a circular bearing eye 43. In the fully assembled state, the bearing eyes 43 hold the bearing journals 44 (FIGS. 2, 10) that are formed onto the sides of valve flap 2. The pivoting arms 33 are formed radially outward onto the bearing journals. The free end of pivoting arms 33 is provided with peg-shaped carriers 45 on the outside, which extend through the holding slots 30 on the floater 1. The bearing journals 44 have a plate-shaped base 46, with which they are formed onto the side of valve flap 2. The bearing journals 44 that are formed onto the plane 47 of base 46 have a square cross section (see FIG. 10) and a width that corresponds to the diameter of the plate-shaped base 46. The width 48 of bearing journals 44 in this case corresponds approximately to the clear width 49 of the insertion slots 52. The plane for bearing journals 44 extends parallel to the longitudinal extension of pivoting arms 33. The valve flap 2 is designed in such a way that its plane 50 forms an obtuse angle α with the pivoting arms 33.

The valve flap 2 and the floater 1 are secured on the support 9 as follows. Starting from the front 38, the valve flap in the position as shown in FIG. 10 is initially fitted with its flattened bearing journals 44 into the insertion slots 42. At the end of this insertion movement, the bearing journals 44 extend through the bearing eyes 43. The valve flap then rests against an end stop 52 on the inside wall of support 9. The valve flap position shown in FIG. 10 is secured in this way on the inside of support 9. To facilitate the insertion of the bearing journals 44 into the insertion slot, the peripheral half of the frontal side 38 that is facing away from the guide rail 39 is slanted less, so as to form stop edges 53 on the other peripheral half The bearing journals 44 are fitted with their flat sides against these stop edges 53 and are then pushed into the guide slots 42. The floater is then fitted onto the longitudinal section 8, wherein the guide rail 39 of support 9 rests inside the guide groove 36 of the floater. In the pre-assembly position shown in FIG. 3, the guide ridges 34 rest on support projections 54 that are formed onto the side of the support. Flexible tongues 55 are formed onto the support projections 54 and extend with a slanted section 56 toward the guide rails 40. The wall ridges 28 shown in FIG. 3 are also provided with a slanted overrun 57, which slightly and elastically deforms the pivoting arms 33 in the direction of arrow 58. These pivoting arms push the valve flap 2 against the end stop 53. In the event that the floater 1 is moved further in the direction of arrow 59, starting with the pre-assembly position shown in FIG. 3, the guide ridges 34 with their projections 35 are pushed onto the guide rails 40. In the process, the projection 35a that is arranged at the free end of the guide ridges 34 elastically deforms the flexible tongues 55 in the direction of arrow 60. After the projection 35a has passed the flexible tongue 55, the tongue snaps back to its starting position, shown in FIG. 3, and axially secures the floater 1. During this movement of fitting on the floater 59, the free ends 62 of the pivoting arms hit against the end stop 32 on the wall ridge 29. The slanted overrun 57 at the same time disengages from the pivoting arms 33 or their carriers 45, so that the carriers 45 snap into the holding slots 30 as a result of elastic resetting forces. In the final assembly position, the floater 1 occupies approximately the position shown in FIG. 1. This movement for fitting on the floater 1 is limited by end stops 63 that are formed onto the guide rails 40. On one side of the support 9, a stop bracket 64 is formed on near the bearing eye 43 (FIGS. 1 and 3). The stop bracket 64 is positioned such that it is only a short distance from the bearing end 65 of the associated pivoting arm 33. The bearing end 65a (FIG. 2) of the opposite arranged bearing arm 33a is extended. The valve flap therefore cannot be mounted in such a way that the position of pivoting arms 33 and 33a is reversed because in the reversed position the pivoting arm 33a hits the stop bracket 65 with its extended bearing end 65a and the valve flap cannot be inserted properly into the support.

During the operation, the floater 1 assumes the position shown in FIG. 7 if the fuel filling level is low. The valve flap 2 is opened. If fuel is added via the filling pipe, the fuel level 18 rises and finally reaches the level shown in FIG. 7. As soon as the fuel level reaches the front side of floater 1 or the frontal plane 17, the gas volume 66 inside the floater is enclosed. The higher the fuel level 18 rises, the larger the displaced fuel volume and, accordingly, the lifting power. Once the fuel level has reached approximately the level 18a, the floater is in the extreme upper position, in which the valve flap 2 is closed (FIG. 8). Owing to the relatively short pivoting arms 33, the floater 1 then covers only a very short displacement distance 67 (FIG. 7). This displacement distance can be taken directly from FIGS. 7 and 8, which represent an exemplary embodiment on a scale of 1:1. The distance amounts to only approximately 1.2 cm.

Reference Number List 1 floater
2 valve flap
3 pipe section
4 fuel tank
5 flange
6 wall
7 longitudinal section
8 longitudinal section
9 support
10 snap-in connection
12 axial direction
13 outside wall
14 inside wall
17 frontal wall
16 longitudinal axis
17 frontal plane
18 fuel level
19 center longitudinal axis
20 holding cavity
21 central wall region
22 longitudinal edge
23 wall region
24 plane
25 pivoting axis
26 slanted section
27 edge
28 wall ridge
29 wall ridge
30 holding slot
32 end stop
33 pivoting arm
34 guide web
35 projection
36 guide groove
37 longitudinal ridge
38 frontal side
39 guide rail
40 insertion slot
43 bearing eye
44 bearing journal
45 carrier
46 base
47 planar surface
48 width
49 clear width
50 plane
52 end stop
53 support projection
55 flexible tongue
56 slanted section
57 slanted overrun
58 arrow
59 arrow
60 arrow
62 free end
63 end stop
64 stop bracket
65 bearing end
66 gas volume
67 displacement distance

What is claimed is:

1. A flap valve for the filling pipe of a motor vehicle fuel tank, comprising:

a pipe section (3) that projects at a slant into the tank;

a valve flap (2), positioned therein such that it can rotate, with two pivoting arms (33) that project on the side from the pipe section;

a floater (1) that is axially guided along the outside circumferential surface of the pipe section and to which the free ends of the pivoting arms (33) are hinged, wherein in the fully assembled state, the lower front of the floater (1) essentially spans a horizontally extending plane, namely a frontal plane (17).

2. A valve according to claim 1, characterized in that the pivoting arms (33) are shorter than half the outside diameter of the pipe section (3).

3. A valve according to claim 1, characterized in that that the points where the pivoting arms (33) are hinged to the floater are arranged above the frontal plane (17).

4. A valve according to claims 1, characterized by two pairs of wall ridges (28, 29), which respectively project from the floater (1) inside that faces the pipe section (3) and extend in axial direction (16) as well as enclose respectively one holding slot (30) between them, wherein the holding slots (30) extend in crosswise direction to the axial direction (16) and are penetrated by respectively one peg-shaped carrier (45) on the outside of the free ends of the pivoting arms.

5. A valve according to claim 4, characterized in that respectively the wall ridge (29) that is closest to the frontal plane (17) is longer than the respectively other wall ridge (28) and that the pivoting arms (33) in a pre-assembly state are oriented approximately in axial direction and with their carriers (45) and the extended wall ridge (29) jointly function as counter stop while the floater is assembled through sliding it onto the pipe section (3) in axial direction (16).

6. A valve according to claim 5, characterized in that the edge of the shorter wall ridge (28) that follows the holding slot (30) is designed as a slanted overrun (57), which operates jointly with the carrier (45) for the pivoting arms (33).

* * * * *